W. SCHILLING.
COUPLING FOR WAGONS.
APPLICATION FILED MAR. 31, 1914.
1,204,698.
Patented Nov. 14, 1916.
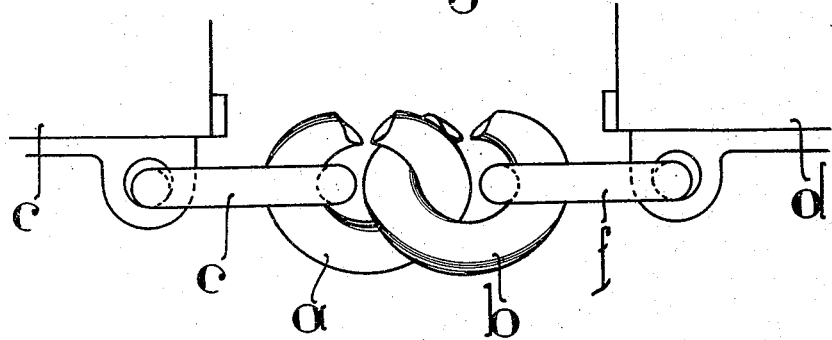
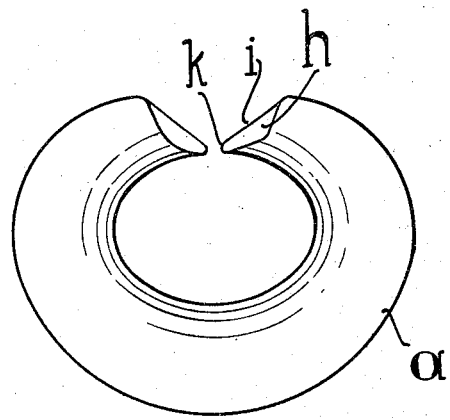
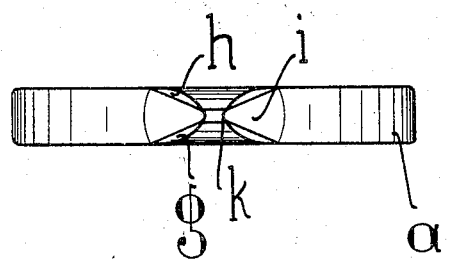
WITNESSES:
INVENTOR
Werner Schilling.
BY Carl P. Goepel
ATTORNEY.

UNITED STATES PATENT OFFICE.

WERNER SCHILLING, OF DUISBURG, GERMANY.

COUPLING FOR WAGONS.

1,204,698.  Specification of Letters Patent.  Patented Nov. 14, 1916.

Application filed March 31, 1914. Serial No. 828,440.

*To all whom it may concern:*

Be it known that I, WERNER SCHILLING, a citizen of the German Empire, and residing at Duisburg, Germany, have invented certain new and useful Improvements in Couplings for Wagons, of which the following is a specification.

My invention relates to couplings for wagons especially mine-wagons, and a primary object is to provide an improved coupling which is simple, strong and short and has the special advantage that it can be coupled and uncoupled by one hand. To this end, the coupling members are not only slit in known manner at one place and pushed one over the other at the slits, but the ends made by the cuts are pointed and the coupling members are simple oval rings. As the coupling member consists solely of an oval ring suspended in the eye of the delivery wagon it can be freely moved by one hand and placed crosswise as is necessary for suspending it in the other ring depending from the other wagon. This suspension is facilitated by the ends being formed not as formerly like sharp cutting edges, but as points. The rings after being hung one in the other always at once occupy such a position that they cannot become automatically uncoupled and, on the other hand, when out of use they always hang so that the coupling member held by one hand can be inserted into the other member.

The oval form of ring is in itself not new in the art, inasmuch as closed rings like the links of chains have heretofore been used as loose couplings; further, harness hooks are known comprising several links, one of which has been cut open in one of its long sides and provided with pointed ends at the cut. By transferring these two features known in themselves and combining them in a delivery wagon coupling I obtain an improved coupling having material advantages in manipulation.

To these ends, the invention consists in the construction, arrangement and combination of parts described hereinafter and pointed out in the claims.

A preferred form of my invention is represented by way of example in the accompanying drawing, wherein:—

Figure 1 is a side elevation showing the improved coupling in its tensioned position, Fig. 2 is a like view of one coupling member alone, and Fig. 3 is a top plan view of the member shown in Fig. 2.

Referring to the drawing, the coupling members are two oval rings $a$ and $b$ which are respectively freely suspended in the links $e$ and $f$ mounted on the delivery wagons $c$ and $d$, respectively. The rings $a$ and $b$ are cut through and according to my invention the cut ends of each of these cut rings are provided not only with the slanting or beveled faces $g$ and $h$, but also with the slanting or beveled face $i$, so that points $k$ are formed in contrast to former constructions in which the cut ends were only beveled in two planes so as to form a line of intersection and it is possible to insert the two rings into one another when the one ring, as $a$, hangs vertically downward, while the other ring, as $b$, is turned slantwise. In consequence of the form of the points the ring $b$ need not be turned more than an amount which is readily possible although it is suspended in the link $f$. From this it will be understood that the coupling can be manipulated with one hand.

I claim:—

1. In a wagon coupling, a coupling ring having one portion thereof cut through, the cut ends of said ring being pointed, the surface of said points extending in oppositely inclined directions toward each other, said cut through portion being relatively narrow at the inner periphery of said ring and relatively wide at the outer periphery thereof.

2. In a wagon coupling, an oval coupling ring having one of the long sides thereof cut through, the cut ends of said ring being pointed, the surface of said points extending in oppositely inclined directions toward each other, and being leveled in more than two planes, said cut through portion being relatively narrow at the inner periphery of said ring and relatively wide at the outer periphery thereof.

3. In a wagon coupling, the combination with two freely hanging links, supported in stationary eyelets, and two matched coupling rings freely suspended in said links, said rings being of oval shape and having one of their long sides cut through, the cut ends of said rings being pointed, the surfaces of said points extending in oppositely inclined directions toward each other, said cut through portion being relatively narrow at the inner periphery of said ring and relatively wide at the outer periphery thereof, said cut through portions permitting coupling of said rings, at any position between right angular position with respect to each other and substantially 45° at either side thereof.

In testimony, that I claim the foregoing as my invention, I have signed my name in presence of two subscribing witnesses.

WERNER SCHILLING. [L. S.]

Witnesses:
HELEN NUFER,
ALBERT NUFER.

Copies of this patent may be obtained for five cents each, by addressing the "Commissioner of Patents, Washington, D. C."